May 4, 1965
S. A. LINKOWSKI
3,182,257
ELECTRONIC TEST PROBE
Filed May 18, 1961
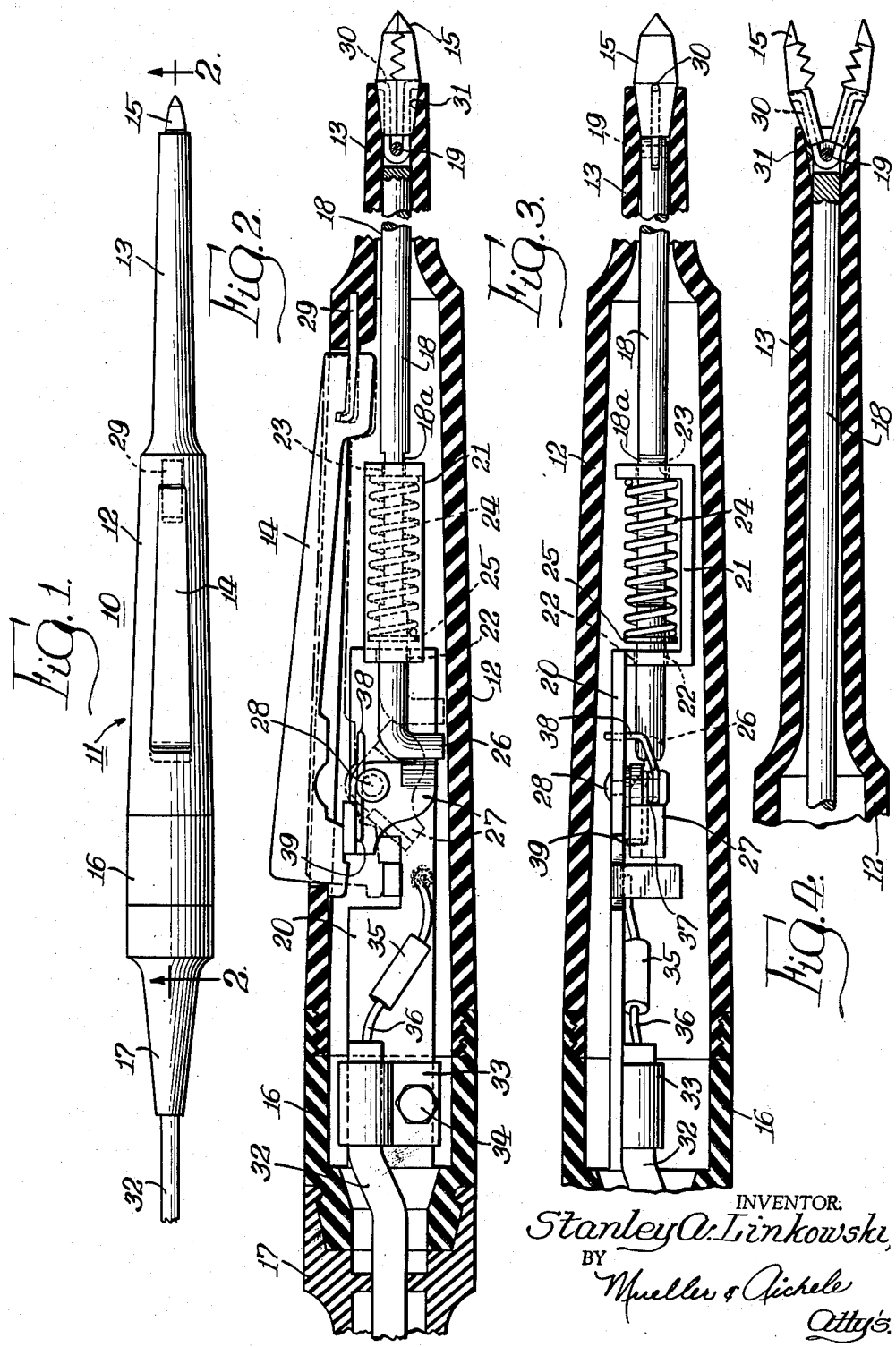
INVENTOR.
Stanley A. Linkowski,
BY
Mueller & Aichele
Atty's.

United States Patent Office 3,182,257
Patented May 4, 1965

3,182,257
ELECTRONIC TEST PROBE
Stanley A. Linkowski, Franklin Park, Ill., assignor to Motorola, Inc., Chicago, Ill., a corporation of Illinois
Filed May 18, 1961, Ser. No. 111,024
3 Claims. (Cl. 324—149)

This invention relates in general to test probes and, in particular, to a test probe for connecting a test instrument to a desired point in an electrical circuit and having spring-loaded mechanical mating jaws operable by a pushbutton lever.

In the past, test probe devices have been provided of the type terminating in a hook or an elongated metal tip which must be manually held in physical contact with the point to be tested in an electrical circuit. This type of test probe may become detached or requires the continuous use of one hand at all times, and is suitable only for simple voltage or current measurements.

Other types of test probe devices employ mechanical jaws, one such type being commonly known in the art as an alligator clip. This type, however, required the use of thumb and forefinger to operate the jaws in relatively close proximity of the electrical circuit such that the danger of electrical shock is present. The mechanical jaws of this type are relatively large and present a danger of causing shorts in those areas of congested electronic circuitry. Further, the alligator clips themselves are suitable only for making simple voltage or current measurements since there is no provision for compensating circuitry.

Still other types of test probes are known which are intended for more complex measuring functions, and which include a housing for accommodating various compensating circuitry. These latter types usually include means for holding the probe on the test point. This may be an alligator clip fitted on the end of the probe, or it may include mechanical jaws operable by sliding action in a manner similar to the action of a hypodermic apparatus. The latter types of test probes still have the disadvantage of having relatively large mechanical jaws and therefore must be carefully inserted into an electrical circuit and attached to the desired testing point to minimize the risk of causing an electrical short. Further, they are cumbersome and awkward to manipulate.

Accordingly, an object of the present invention is to provide a test probe apparatus having mechanical jaws of minimum size for convenient access into small areas and congested circuitry, and having an adequate jaw opening.

Another object of the present invention is to provide a test probe apparatus having spring-loaded mechanical jaws operable by a pushbutton lever located in the body of the apparatus.

Another object of the invention is to provide a test probe apparatus adaptable to various phases of electrical testing by having a housing member to accommodate the required compensating circuitry.

A further object of the invention is to provide a test probe apparatus whose only exterior conductive surface is a pair of mechanical jaws partially extending from its forward end to effectively minimize accidental short circuits from occurring within areas of congested circuitry.

A feature of the present invention is the provision of test probe apparatus having an elongated portion from which jaws extend and a mechanical crank arm to translate a downward vertical motion of a pushbutton as a forward horizontal motion to operate the mechanical mating jaws.

Another feature of the invention is the provision of test probe apparatus with an exterior surface constructed entirely of a non-conducting, thermosetting plastic material, with metallic mating jaws partially extending from the front end of the probe.

A further feature of the invention is the provision of a test probe having a housing assembly especially suited to the shape of the hand, with a forward tubular portion of reduced diameter which supports the jaws of the probe to provide convenient access to and in areas of relatively congested electrical circuitry. The probe may have a provision for accommodating within the housing thereof the required compensating circuitry.

In the accompanying drawings:
FIG. 1 is a top perspective view of the test probe;
FIG. 2 is a side cross sectional view of the test probe;
FIG. 3 is a top cross section view of the test probe; and
FIG. 4 is a partial illustration of the mating jaws in the open position.

In practicing the invention, a test probe apparatus is provided including a housing assembly constructed of insulating material and having an extended tubular portion of reduced diameter. Spring-loaded mechanical mating jaws partially extend from the tubular portion of the housing. A pushbutton lever is included in the body of the housing assembly and upon being depressed cooperates with an internal crank arm to move the jaws from the housing whereby the spring loaded jaws open. A spring is provided for drawing the jaws against the housing to close the same. The test probe apparatus may be conveniently adapted for use in various phases of electrical testing by providing the required compensating circuitry within the housing assembly.

In the accompanying drawings, FIG. 1 is a top perspective view of the test probe indicated generally by the numeral 10 and consisting of a housing 11 having a main body portion 12. A pushbutton lever 14 is located on the housing. The housing has a tapered forward portion 13 from which the mechanical mating jaws 15 partially protrude. As shown in FIG. 2 a rear housing portion 16 includes internal threads at its forward end to mate with the external threads at the rearward end of main housing 12. Rear housing 16 is covered at its rearward end by rubber boot 17 which surrounds the connecting cable 32.

Referring to the internal construction, mating jaws 15 are mechanically attached to operating rod 18 by connecting pin 19. The rearward portion of operating rod 18 is supported within the forward U-shaped guide section 21 of main support 20 (FIGS. 2 and 3). Guide section 21 includes a circular aperture 22 and a rectangular aperture 23 of reduced size to receive operating rod 18. Operating rod 18 has double flats indicated by numeral 18a which cooperates with rectangular aperture 23 to prevent rotation of operating rod 18 during longitudinal movement. A resilient return spring 24 is disposed upon operating rod 18 and contained within guide section 21. Spring 24 is restricted at its forward end by guide section 21 and is compressed by the action of retaining ring 25 at its rearward end affixed within a provided slot on operating rod 18.

As shown in FIG. 2, operating rod 18 includes an L-shaped portion 26 at its rearward end. L-portion 26 has a vertical flat which engages the forward edge of a mechanical crank arm 27. Crank arm 27 is pivotably attached to main support 20 by a shoulder rivet 28 which forms an axis about which crank arm 27 is free to pivot. Pushbutton lever 14 rests on the top flanged portion of crank arm 27 at its rearward end and is pivotably attached to main housing 12 at its forward end by a connecting hinge 29. Hinge 29 is partially imbedded in lever 14 and fits in a recess provided in housing 12. A resilient torque spring 37 (shown in FIG. 3) is disposed around shoulder rivet 28 having finger arms 38 and 39. Forward finger arm 28 is positionally affixed to main support 20 in a provided recess. The rearward finger arm 39 extends under the top flange portion of crank arm 27 such that torque spring 37 will be compressed by the downward motion of pushbutton lever 14.

When pushbutton lever 14 is depressed at its free rearward end, crank arm 27 pivots around rivet 28 and translates the downward vertical motion of lever 14 to a forward horizontal motion which is transmitted to operating rod 18. Such action is graphically illustrated by the dotted lines in FIG. 2. The forward motion of operating rod 18 causes the mating jaws 15 to extend beyond the forward tapered portion 13. The jaws then open by action of outward pressure exerted on the opposing jaws by the jaw spring 30, as shown in FIG. 4.

Upon release of pushbutton lever 14, operating rod 18 is forced rearward or inward by the action of return spring 24, which has been compressed by the forward motion of operating rod 18. In the subsequent rearward motion of operating rod 18, mating jaws 15 are partially pulled back into housing portion 13 and are compressed to a closed position by action of the internal tapered portion of the housing, indicated generally by numeral 31 (FIGS. 2 and 4), against which the jaws are forced.

If the mating jaws 15 have been attached to a physical component, it can be seen that the operating rod 18 will be prevented from retracting to its fully unactuated position upon release of pushbutton lever 14. However, since torque spring 37 has been compressed during the downward motion of lever 14, both crank arm 27 and pushbutton lever 14 are returned to their normal position whether operating rod 18 has fully retracted or not. This effectively prevents jamming of the component parts of the test probe if it is abruptly pulled away from the circuit or component under test without first depressing pushbutton lever 14 such that operating rod 18 snaps back to its fully unactuated position.

A section of the associated test cable 32 extends through the rubber boot 17 (FIG. 2), into the cavity of rear housing 16, and is securely attached to the main support 20 by cable clamp 33. Appropriate compensating circuitry may be contained within the cavity of the rear housing section to adapt the test probe for a particular type of testing operation. In the drawings, the test probe is shown as adapted for measuring D.C. voltages with the required compensating resistor 35 connected between the center conductor 36 of test cable 32 and a point on main support 20. Electrical continuity is thus completed through mating jaws 15, brass operating rod 18, main support 20, and resistor 35 to the interconductor 36 of test cable 32. It is to be understood, however, that other compensating circuitry may readily be incorporated to adapt the test probe apparatus for other phases of electrical testing and measuring, e.g., A.C. voltage measurements, oscilloscope pickup, and other like functions.

The invention therefore provides an unusually simple and ruggedly constructed test probe apparatus which is readily adapted for various phases of electrical testing. A pushbutton lever is included in the body of the housing assembly to operate mechanical mating jaws partially extending from the front end of the probe. The only exterior metallic structure is the mechanical jaws which are of a size to minimize inadvertent short circuits within the circuitry under test.

I claim:

1. A test probe apparatus for use in testing electrical circuits including in combination; a cylindrical housing assembly constructed of insulating material, said housing assembly including a main housing section having an extended tubular portion of reduced diameter, a rear housing section having a cable sleeve of pliant material covering its rearward end, said housing sections having mating threads for joining the same together, support means having a guide portion and a mounting portion contained within said housing assembly, a test cable extending through said cable sleeve into said housing assembly and being mechanically clamped to said mounting portion, a pushbutton lever extending within a longitudinal slot in said main housing, means attaching one end of said pushbutton lever to said main housing with the other end thereof being free to move in a downward motion on being depressed, mechanical mating jaws partially contained within said extended tubular portion and having an operating shaft attached thereto and extending inwardly into said housing assembly, spring means within said housing assembly coupled to said operating shaft for drawing said jaws into said housing, a mechanical crank arm pivotably attached to said guide portion and bearing against said pushbutton lever and said operating shaft, said crank arm being operative to transmit the downward motion of said pushbutton lever as a forward motion to said operating shaft thereby extending said mechanical jaws outward from said tubular portion, said jaws having spring means to open the same in the extended position, said tubular portion being shaped to engage and compress said jaws upon movement of said operating shaft to draw said jaws into said housing, and compensating circuit means contained within said housing assembly mechanically mounted on said mounting portion and electrically connected between said test cable and said mating jaws to adapt said test probe apparatus for a particular type of electrical measurement.

2. A test probe apparatus for connecting a testing instrument into an electrical circuit and including in combination; a cylindrical housing assembly constructed of insulating material and having an extended tubular portion of reduced diameter at its forward end, a pushbutton lever contained within a longitudinal slot in said housing, first spring means attaching one end of said pushbutton lever to said housing with the other end being free to move in a downward motion, mechanical jaws partially contained within said tubular portion and having an operating shaft attached thereto and extending inwardly into said housing assembly, main support means contained within said housing assembly and having a traverse lever pivotably attached thereto and operatively engaging said pushbutton lever, said support means having a U-shaped forward portion with apertures for receiving a portion of said operating shaft with the rearward end of said shaft abutting against the forward edge of said traverse lever, said traverse lever thereby transmitting the downward motion of said pushbutton lever as a forward motion to said operating shaft to extend said jaws outward from said forward tubular portion, second spring means coupled to said jaws to open the same in the extended position, and third spring means disposed upon said operating shaft to retract said jaws upon release of said pushbutton lever, said tubular portion being shaped to engage and compress said jaws upon movement of said operating shaft to retract said jaws into said housing.

3. Test probe apparatus for use in testing electrical circuits, including in combination, a cylindrical housing assembly constructed of insulating material, said housing assembly including a main housing section having an extended tubular portion of reduced diameter, a rear housing section having a cable sleeve of pliant material covering its rearward end, said housing sections having mating threads for joining the same together, support means contained within said housing assembly, said support means having a U-shaped guide bracket and a rear portion, a test cable extending through said cable sleeve into said housing assembly, clamping means mechanically fastening said test cable to said rear portion, a pushbutton lever extending within a longitudinal slot in said main housing, first spring means attaching one end of said pushbutton lever to said main housing with the other end of said lever being free to move in a downward direction on being depressed, mechanical mating jaws partially contained within said extended tubular portion, an operating shaft having one end attached to said jaws and the other end extending inwardly into said housing assembly and being slidably supported by said guide section, said operating shaft having a shoulder thereon located within said U-shaped guide bracket, second spring means positioned on said operating shaft between said shoulder and said guide bracket for urging said operating shaft rearward thereby drawing said jaws into said housing, a mechanical crank arm pivotally attached to said support means and bearing against said pushbutton lever and said operating shaft, said crank arm being operative to transmit the downward motion of said pushbutton lever as a forward motion to said operating shaft, thereby extending said mechanical jaws outwardly from said tubular portion, third spring means positioned within said mechanical jaws and acting to bias open the same, said tubular portion being shaped to engage and compress said jaws upon movement of said operating shaft to draw said jaws into said housing, and electrical compensating circuit means contained within said housing assembly mechanically mounted on said rear portion and electrically connected between said test cable and said mating jaws to adapt said test probe apparatus for a particular type of electrical measurement.

References Cited by the Examiner

UNITED STATES PATENTS

| | | | |
|---|---|---|---|
| 1,869,181 | 7/32 | Beck | 339—108 |
| 2,831,174 | 4/58 | Hilmo | 339—108 |
| 2,857,572 | 10/58 | Belart | 324—149 |
| 2,884,597 | 4/59 | Miller | 324—149 |
| 2,894,205 | 7/59 | Schrock | 324—72.5 |

FOREIGN PATENTS

| | | |
|---|---|---|
| 1,117,472 | 5/56 | France. |
| 770,892 | 3/57 | Great Britain. |
| 415,920 | 11/46 | Italy. |

OTHER REFERENCES

Hewlett-Packard: Journal, vol. 7, No. 8, April 1956, (page 5 relied on).

"Combined Test Prod and Clip," by C. Bayley in Wireless World Magazine, February 1958, pp. 75–77.

IBM Technical Disclosure Bulletin, vol. 2, No. 2, August 1959.

WALTER L. CARLSON, *Primary Examiner.*

BENNETT G. MILLER, *Examiner.*